000
United States Patent [19]

Pfüller

[11] Patent Number: 4,865,824

[45] Date of Patent: Sep. 12, 1989

[54] PROCESS FOR RECOVERING GALLIUM FROM BASIC AQUEOUS SODIUM ALUMINATE SOLUTIONS BY MEANS OF LIQUID-LIQUID EXTRACTION

[75] Inventor: Peter Pfüller, Burgkirchen, Fed. Rep. of Germany

[73] Assignee: Hoechst Aktiengesellschaft, Frankfurt am Main, Fed. Rep. of Germany

[21] Appl. No.: 204,040

[22] Filed: Jun. 8, 1988

[30] Foreign Application Priority Data

Jun. 11, 1987 [DE] Fed. Rep. of Germany ....... 3719437

[51] Int. Cl.$^4$ ...................... C01G 15/00; C22D 58/00; B01D 11/00
[52] U.S. Cl. .................................. 423/112; 423/122; 423/131; 423/624
[58] Field of Search ................ 423/112, 122, 131, 624

[56] References Cited

U.S. PATENT DOCUMENTS

| | | | |
|---|---|---|---|
| 3,971,843 | 7/1976 | Helgorsky et al. | 423/112 |
| 4,135,917 | 1/1979 | Badaliants et al. | 75/109 |
| 4,169,130 | 9/1979 | Helgorsky et al. | 423/112 |
| 4,241,029 | 12/1980 | Helgorsky et al. | 75/101 BE |
| 4,485,076 | 11/1984 | Bauer et al. | 75/101 BE |
| 4,559,203 | 12/1985 | Bauer et al. | 423/112 |
| 4,568,526 | 2/1986 | Rouillard nee Bauer et al. | 423/87 |
| 4,587,111 | 5/1986 | Wynn | 423/112 |
| 4,666,686 | 5/1987 | Krajewski et al. | 423/112 |
| 4,724,129 | 2/1988 | Helgorsky et al. | 423/112 |
| 4,741,887 | 5/1988 | Coleman et al. | 423/112 |
| 4,759,917 | 7/1988 | Coleman et al. | 423/112 |

OTHER PUBLICATIONS

Handbook of Solvent Extraction, Lo et al., John Wiley & Sons, N.Y., 1983, pp. 633–635.

*Primary Examiner*—Robert L. Stoll
*Assistant Examiner*—Paige C. Harvey

[57] ABSTRACT

A process is described for recovering gallium from a basic aqueous sodium aluminate solution by means of liquid-liquid extraction, in which process the aqueous sodium aluminate solution to be extracted is brought into contact with a water-insoluble extraction solution, comprising essentially a water-insoluble substituted hydroxyquinoline and a selected water-insoluble aldoxime as extractant, and a water-insoluble organic solvent for the extractant, the organic phase is separated off from the aqueous phase after bringing the two solutions into contact, and the gallium is recovered from the organic phase.

9 Claims, No Drawings

PROCESS FOR RECOVERING GALLIUM FROM BASIC AQUEOUS SODIUM ALUMINATE SOLUTIONS BY MEANS OF LIQUID-LIQUID EXTRACTION

Process for recovering gallium from basic aqueous sodium aluminate solutions by means of liquid-liquid extraction

DESCRIPTION

The invention relates to a process for recovering gallium from a basic aqueous sodium aluminate solution by means of liquid-liquid extraction, in which process the basic aqueous sodium aluminate solution is brought into contact with a water-insoluble organic extraction solution in order to take up the gallium, the water-insoluble organic extraction solution essentially comprising a gallium extractant containing a water-insoluble substituted hydroxyquinoline, and a water-insoluble organic solvent for the extractant, the organic phase is separated off from the basic aqueous phase after bringing the two solutions into contact, and the gallium is recovered from the organic phase.

A process of this type is known from the two U.S. Pat. Nos. 3,971,843 and 4,559,203. According to the first patent, a water-insoluble substituted hydroxyquinoline alone is employed as the extractant for the gallium, and according to the second patent, hydroxyquinoline is employed in combination with an acidic organic phosphorus compound.

Gallium occurs in small amounts in bauxite, generally in an amount from 0.002 to 0.01% by weight, relative to bauxite. In order to recover pure aluminum oxide from bauxite, the bauxite is digested using sodium hydroxide solution by the Bayer process, the aluminum dissolving as aluminate and the gallium as gallate. The so-called Bayer Lye is thus a valuable source of raw materials for recovering gallium. Thus, the aqueous sodium aluminate solutions of varying basicity (the OH ion concentration is generally 3 moles per liter) obtained by the Bayer process contain about 100 to 400 g of $Na_2O$ per liter, about 40 to 150 g of $Al_2O_3$ per liter and 100 to 300 mg of Ga per liter. As stated above, the aluminum and the gallium are present in the form of the aluminate and gallate anions, which can be represented by $Al(OH)_4^{\ominus}$ and $Ga(OH)_4^{\ominus}$.

In known liquid-liquid extractions of gallium from the sodium aluminate solutions in question by bringing the aqueous aluminate solution into contact with a water-insoluble substituted hydroxyquinoline (8-hydroxyquinoline) which is dissolved in a water-insoluble organic solvent (extraction solution), the gallium is transferred and bound, at the aqueous-organic phase phase boundary, to the hydroxyquinoline in the form of a chelate until equilibrium is reached. The equilibrium should be reached as quickly as possible, since the throughput of the aqueous and organic phases in the extraction plant depend thereon. If the extraction equilibrium is achieved only slowly, the residence time of the organic and aqueous phases in the extraction plant must be extended correspondingly, at the expense of the throughput. If the water-insoluble hydroxyquinoline described in U.S. Pat. No. 3,971,843 is used as the only extractant for the gallium, a relatively long time is required to achieve the equilibrium mentioned. There has been no lack of attempt to influence and accelerate the kinetiks of the extraction by employing the hydroxyquinolines, which are advantageous per se, together with a further selected water-insoluble organic compound which functions, in particular, as an accelerator. Thus, in U.S. Pat. No. 4,559,203, water-insoluble substituted hydroxyquinolines and acidic organic phosphoric acid compounds, such as monoesters or diesters of phosphoric acid, phosphonic acid or phosphinic acid, are employed as extractants. In addition, carboxylic acids were already employed as extractants for gallium together with hydroxyquinoline, in this patent. However, these known mixtures of hydoxyquinoline and carboxylic acid or phosphoric acid esters as accelerators still have the disadvantage that the intended high extraction rate is not thus achieved.

The object of the invention is, in particular, to find effective accelerators for hydroxyquinoline with respect to use as extractants for gallium from Bayer Lyes, i.e. to propose an agent for extracting gallium from basic aqueous sodium aluminate solutions, which agent comprises hydroxyquinoline and a further water-insoluble organic compound as a particularly effective accelerator, so that the extraction equilibrium in question is achieved in a relatively short time with virtually complete extraction of the gallium.

The process according to the invention for recovering gallium from a basic aqueous sodium aluminate solution by means of liquid-liquid extraction, in which process the basic aqueous sodium aluminate solution is brought into contact with a water-insoluble organic extraction solution in order to take up the gallium, the water-insoluble organic extraction solution essentially comprising a gallium extractant containing a water-insoluble substituted hydroxyquinoline, and a water-insoluble organic solvent for the extractant, the organic phase is separated off from the basic aqueous phase after bringing the two solutions into contact, and the gallium is recovered from the organic phase, which process comprises employing, as gallium extractant, a water-insoluble substituted hydroxyquinoline in combination with a water-insoluble aldoxime of the formula I below $$R-\underset{\underset{H}{|}}{C}=NOH$$

in which R is an alkyl, alkenyl, alicyclic or aryl radical, the aldoxime:hydroxyquinoline weight ratio being 10:1 to 1:10.

Since aldoximes do not form chelates and accordingly are not capable of extracting metals, in particular gallium, it was a surprising result that a significant acceleration in achieving the equilibrium distribution of gallium between the basic aqueous phase and the organic phase is achieved by means of the addition, according to the invention, of aldoximes to substituted hydroxyquinolines.

The aldoxime:hydroxyquinoline weight ratio is preferably 2:1 to 1:2 and in particular about 1:1. Preferred aldoximes are those of the formula I which are produced when R is an alkyl radical having 4 to 18 carbon atoms, preferably having 5 to 12 carbon atoms. The alkyl radical may be straight-chain or branched. Examples of suitable representatives are 2-ethylbutanal oxime, n-pentanal oxime, n-oxtanal oxime, 2-ethylhexanal oxime, isononal oxime, n-decanal oxime, 2-methyldecanal oxime, 2-methylundecanal oxime, n-dodecanal oxime, isotridecanal oxime and n-pentadecanal oxime. The aldoximes to be employed according to the invention are known and commerically available. It is possible to employ an aldoxime compound alone or a mixture of two or more aldoximes.

The amount of extractant, i.e. the amount (total by weight) of hydroxyquinoline and aldoxime, may vary within broad limits. It is generally 1 to 50% by weight, preferably 5 to 30% by weight, relative to the weight of the extraction solution, i.e. the weight of extractant (hydroxyquinoline plus aldoxime) and solvent (including any solubilizer).

The hydroxyquinolines employed are preferably those of the formula II below

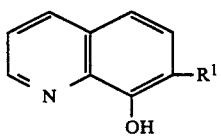

in which $R^1$ is a (straight-chain or branched) alkyl radical having 5 to 15 carbon atoms, preferably having 8 to 12 carbon atoms. These 8-hydroxyquinolines are well known from the U.S. Patents mentioned in the introduction. It is possible to employ one hydroxyquinoline compound alone or a mixture of two or more hydroxyquinolines. The amount of hydroxyquinoline to be employed arises, like that of aldoxime, from the specified amount of extractant and from the specified aldoxime:hydroxyquinoline weight ratio.

The water-insoluble organic solvents employed for the extractant are, as in the known processes, preferably aliphatic hydrocarbons, such as hexane, heptane and petroleum fractions of the kerosene type, aromatic hydrocarbons, such as benzene, toluene, xylene and cumene, or chlorinated hydrocarbons, such as chloroform, carbon tetrachloride, dichloroethane or trichloropropane. The amount of organic solvent used to prepare the extraction solution arises from the stated concentration of extractant in the solution.

According to the prior art (see the patents mentioned in the introduction), solubilizers, also known as modifiers, for the gallium complex compound are added to the hydroxyquinoline-containing extraction solution. It has been shown that the extractive action of the hydroxyquinoline/aldoxime mixture to be employed according to the invention is also advantageously influenced by the solubilizers mentioned. Preferred solubilizers are alkanols having 4 to 18 carbon atoms, preferably 8 to 14 carbon atoms, such as hexanol, decanol, isodecanol, dodecanol, isotridecanol and pentadecanol; triesters of phosphoric acid ($H_3PO_4$) with alkanols having 4 to 10 carbon atoms, such as tributyl phosphate, trihexyl phosphate and trinonyl phosphate; diesters of mono-($C_1$–$C_8$-alkyl)-phosphonic acids with alkanols having 4 to 10 carbon atoms, such as dibutyl butylphosphonate, dinonyl butylphosphonate and di-2-ethylhexyl octylphosphonate; esters (monoesters) of di-($C_1$–$C_8$-alkyl)-phosphinic acids, such as butyl dibutylphosphinate, nonyl dibutylphosphinate and hexyl dioctylphosphinate; and tri-($C_1$–$C_8$-alkyl)-phosphine oxides, such as tributylphosphine oxide, trihexylphosphine oxide and tricotylphosphine oxide. The solubilizers are generally employed in an amount from 1 to 20% by weight, preferably 5 to 10% by weight, percentages by weight relating to the weight of the extraction solution, i.e. the total by weight of hydroxyquinoline, aldoxime, organic solvent and solubilizer.

The amount of extraction solution to be employed according to the invention compared with the amount of sodium aluminate solution to be extracted can vary within broad limits. In general, the ratio between the amount by volume of the extraction solution and the amount by volume of the sodium aluminate solution if 1:0.5 to 1:5, preferably about 1:1. The temperature during the extraction according to the invention can also vary within broad limits. It is generally carried out at a temperature of 15° to 60° C., preferably 20° to 40° C. Using the extractant according to the invention, extractions can thus be carried out at room temperature or at the temperature at which the Bayer Lyes are produced (i.e. about 50° C.).

The process according to the invention for extraction of basic aqueous sodium aluminate solutions can be carried out in customary apparatuses as exist for liquid-liquid extractions. In these, as is known, the aqueous solution to be extracted, i.e. the basic aqueous sodium aluminate solution, and the extraction solution are brought into contact by mixing in cocurrent or countercurrent continuously or in batches, after which the organic phase containing the extracted gallium is separated off from the aqueous phase after the extraction equilibrium is achieved.

The recovery of the gallium from the organic phase obtained also takes place by methods which are known in the prior art. These are described in detail in the publications mentioned in the introduction. In the context of the process according to the invention, the recovery of gallium is preferably carried out as follows. The organic phase containing the gallium is brought into contact with a first, dilute aqueous solution of a mineral acid (using one of the abovementioned methods) in order to take up, in the dilute aqueous mineral acid solution, the sodium and aluminum components which may be present in the organic phase, while the gallium remains in the organic phase. After separating off the organic phase from the aqueous dilute acid solution, the organic phase is brought into contact with a second, more highly concentrated solution of a mineral acid in order to take up the gallium from the organic phase in the second aqueous mineral acid solution, from which it is then recovered. These extractions are carried out at a temperature of, preferably, 15° to 25° C. The mineral acids employed are preferably hydrochloric acid, sulfuric acid or nitric acid, sulfuric acid and hydrochloric acid being preferred. The concentration of mineral acid in the dilute aqueous solution is in the range of 0.1 to 1 mole per liter, preferably 0.3 to 0.7 mole per liter, and the concentration of mineral acid in the concentrated aqueous solution is in the range of 1.5 to 3 moles per liter, preferably 2 to 2.5 moles per liter. The ratio by volume between the mineral acid solutions and the phases to be treated therewith is 5:1 to 1:5, preferably about 1:1. The gallium is obtained in the form of salts, such as gallium sulfate or gallium chloride.

Using the process according to the invention for extraction of gallium from basic aqueous sodium aluminate solutions, the extraction equilibrium is achieved rapidly and extraction of the desired gallium is achieved virtually completely. The novel process can be carried out in plants which are customary for liquid-liquid extractions. Neither does it require any particular process conditions, for example with respect to temperature, phase control and the like.

The invention is now illustrated in greater detail by means of examples.

EXAMPLES 1 TO 7

In all examples, an industrial sodium aluminate solution (Bayer Lye) of the following composition was employed: 174 g/l of $Na_2O$, 85 g/l of $Al_2O_3$ and 150 mg/l of Ga; the extraction solution comprises 10% by weight of hydroxyquinoline of the formula below

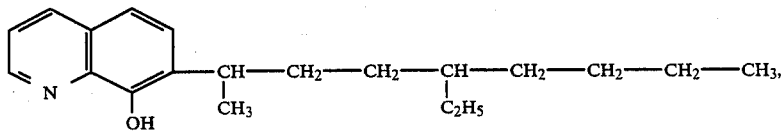

10% by weight of aldoxime (a different aldoxime compound was employed in each example), 10% by weight of isodecanol as solubilizer and 70% by weight of kerosene as organic solvent. The extraction solution thus contained the hydroxyquinoline and the aldoxine in a ratio by weight of 1:1; the amount of extractant (i.e. hydroxyquinoline plus aldoxime in the stated ratio) in the solution was 20% by weight. The aldoximes employed in the examples are indicated below:
Example 1: 2-ethylhexanal oxime
Example 2: n-pentanal oxime
Example 3: 2-ethylbutanal oxime
Example 4: Isononal oxime
Example 5: 2-methylundecanal oxime
Example 6: Isotridecanal oxime
Example 7: 2-methyldecanal oxime In each example, equal parts by volume of sodium aluminate solution and extraction solution in the ratio by volume 1:1 were introduced into a separating funnel and shaken at 20° C. for 1, 2, 5, 10, 20 and 30 minutes, with equal vigor in each case. After separating the two phases, the amount of gallium still present in the aqueous phase was determined analytically; the amount of gallium in the organic phase was determined arithmetically by subtraction.

COMPARATIVE EXAMPLE 1

The procedure carried out was as in Examples 1 to 7 according to the invention, with the difference that no aldoxime was employed; the extraction solution thus comprises 10% by weight of the stated hydroxyquinoline, 10% by weight of isodecanol and 80% by weight of kerosene.

COMPARATIVE EXAMPLE 2

The procedure carried out was as in Examples 1 to 7 according to the invention, with the difference that the 10 g of aldoxime were replaced by 10 g of a phosphoric acid ester as accelerator, to be precise di-(2-ethylhexyl) phosphate.

The results of Examples 1 to 7 according to the invention and the comparative Examples 1 and 2 are collated below. As the values for the amount of gallium extracted, in percent by weight (relative to the amount of gallium in the sodium aluminate solution employed) show, a very high degree of extraction is achieved in a short time using the extractant to be employed according to the invention:

Amount of Gallium extracted in % by weight

|  | Mixing time in minutes | | | | | |
| --- | --- | --- | --- | --- | --- | --- |
|  | 1 | 2 | 5 | 10 | 20 | 30 |
| Examples | | | | | | |
| 1 | 70 | 81 | 92 | 92 | 92 | 92 |
| 2 | 61 | 67 | 74 | 80 | 91 | 91 |
| 3 | 70 | 75 | 91 | 95 | 95 | 95 |
| 4 | 53 | 61 | 84 | 84 | 84 | 84 |
| 5 | 65 | 68 | 77 | 79 | 81 | 82 |
| 6 | 8 | 13 | 43 | 47 | 65 | 84 |
| 7 | 24 | 65 | 72 | 84 | 84 | 84 |
| Comparative Examples | | | | | | |
| 1 | 13 | 16 | 29 | 35 | 43 | 50 |
| 2 | 11 | 20 | 30 | 40 | 50 | 57 |

I claim:
1. A process for the recovery of gallium from a basic aqueous sodium aluminate solution by means of liquid/liquid extraction, said process comprising:
bringing said sodium aluminate solution into contact with a water-insoluble organic extractant for extracting the gallium, said extractant being in solution in a water-insoluble organic solvent and comprising
a water-insoluble substituted hydroxyquinoline complex-forming agent capable of forming a gallium complex compound
a water-insoluble substituted aldoxime of Formula I

wherein R is an alkyl-, alkenyl-, an alicyclic- or an aromatic group, and in which the weight ratio of aldoxime to hydroxyquinoline is from 10:1 to 1:10, thereby obtaining an organic phase, containing said extractant and the water-insoluble organic solvent, and a basic aqueous phase, containing the sodium aluminate;
separating said organic phase from the basic aqueous phase containing the sodium aluminate, and recovering the gallium from said organic phase.
2. A process according to claim 1, wherein the extractant consists essentially of the aldoxime and the hydroxyquinoline in a weight ratio of from 2:1 to 1:2.
3. A process according to claim 1, wherein, in said Formula I, R is an alkyl group with 4 to 18 carbon atoms.
4. A process according to claim 1, wherein 1 to 50 weight-% of the said extractant is dissolved in the water-insoluble organic solvent, based on the weight of the resulting solution.
5. A process according to claim 1, wherein said extractant consists essentially of:

said water-insoluble substituted hydroxyquinoline complex-forming agent capable of forming a gallium complex compound,
said water-insoluble substituted aldoxime of Formula I, and
a solubilizer for the thus-formed gallium complex compound.

6. A process according to claim 2, wherein, in said Formula I, R is an alkyl group with 4 to 18 carbon atoms.

7. A process according to claim 4, wherein, said formula I, R is an alkyl group with 4 to 18 carbon atoms.

8. A process according to claim 5, wherein in said formula I, R is an alkyl group with 4 to 18 carbon atoms.

9. A process according to claim 1, wherein 1 to 50% by weight of the extractant is dissolved in the water-insoluble organic solvent, based on the weight of the resulting solution, and wherein said extractant consists essentially of:
said water-insoluble substituted hydroxyquinoline complex-forming agent capable of forming a gallium complex compound,
said water-insoluble substituted aldoxime of Formula I, wherein R is an alkyl group of 4 to 18 carbon atoms, and
a solubilizer for the thus-formed gallium complex compound; the weight ratio of aldoxime to hydroxyquinoline being in the range of 2:1 to 1:2.

* * * * *